United States Patent [19]

Pannekeet et al.

[11] 4,051,221

[45] Sept. 27, 1977

[54] PROCESS FOR THE SEPARATE RECOVERY OF VANADIUM AND MOLYBDENUM

[75] Inventors: Wilhelmus Pannekeet, Haarlem, Netherlands; Gerhard E. W. K. Steenken, Berzbuir, Germany; Roeland H. Voogd, Purmerend, Netherlands

[73] Assignee: Akzona Incorporated, Asheville, N.C.

[21] Appl. No.: 675,659

[22] Filed: Apr. 12, 1976

[30] Foreign Application Priority Data

Apr. 16, 1975  Netherlands ................... 7504500

[51] Int. Cl.$^2$ ................ C01G 31/00; C01G 39/00
[52] U.S. Cl. ........................... 423/54; 423/63; 423/593; 75/101 BE
[58] Field of Search ............. 423/54, 63, 593; 75/101 BE

[56] References Cited

U.S. PATENT DOCUMENTS

| | | | |
|---|---|---|---|
| 2,937,072 | 5/1960 | McLean | 423/63 |
| 3,376,105 | 4/1968 | Naumann | 423/63 |
| 3,656,936 | 4/1972 | Haas | 423/63 |
| 3,709,974 | 1/1973 | Nutter et al. | 423/63 |
| 3,773,890 | 11/1973 | Fox et al. | 423/63 |

*Primary Examiner*—Herbert T. Carter
*Attorney, Agent, or Firm*—Francis W. Young; Robert F. Green

[57] ABSTRACT

A process of separately recovering vanadium and molybdenum from an aqueous solution containing a vanadium compound is disclosed. The process comprises adjusting the pH of such a solution to a pH between 1.5 and 7, contacting the solution with a weakly basic anion exchanger in the salt form, eluting said anion exchanger with an ammonium hydroxide solution having a strength between about 1 and 4N, crystallizing the resulting ammonium vanadate, and separating the same from the vanadium and molybdenum solution obtained in said elution.

8 Claims, No Drawings

PROCESS FOR THE SEPARATE RECOVERY OF VANADIUM AND MOLYBDENUM

BACKGROUND OF THE INVENTION

The invention relates to a process of separately recovering vanadium and molybdenum from an aqueous solution containing a vanadium compound and a molybdenum compound. Such an aqueous solution is formed for instance by leaching a residue obtained by heating a composition containing vanadium and molybdenum, for example a spent desulphurization catalyst, in the presence, if desired, of substances such as sodium carbonate or sodium chloride (see the German Patent Application 2 316 837). In said German Application it is proposed to selectively extract the solution containing heavy metal with, for instance, a tertiary amine.

In addition to the general disadvantages of a liquid-liquid extraction, such as the solubility of the extraction agent in the water phase with resulting waste problems and separation problems, the above process has the disadvantage that when the extraction agent loaded with the heavy metal is stripped with, for instance, sodium carbonate, precipitation of ammonium vanadate can only be effected after the addition of a large excess of ammonium salt. Stripping with the aid of an ammonium hydroxide solution, which makes it possible in principle to avoid the additional use of ammonium salt, has the disadvantage that there is formed a precipitate which makes it very difficult to separate the aqueous phase from the organic liquid.

Further it is known that strongly basic anion exchange resins such as Amberlite IRA-400, -401, -410 and -411, Permatit S-1 and Dowex -1, -11 and -21K are used in the removal of vanadate ions from aqueous solutions which should have a particular pH-value, the elution of the resin generally being carried out with the aid of an acid or with a specific salt solution, for instance a solution of 3.4 to 4.2 moles of sodium chloride and 0.50 to 0.80 moles of ammonium chloride per liter of the eluant (see for instance the U.S. Pat. Nos. 2,937,072 and 3,376,105, and Chem. Zentralblatt, 1960, No. 50, p. 16677).

GENERAL DESCRIPTION OF THE INVENTION

The present invention provides a process which makes it possible to carry out stripping with an ammonium hydroxide solution, without any undesirable formation of precipitate. Another advantage is that the vanadium is recovered in the form of crystals of very pure ammonium vanadate and that the molybdenum is recovered in the form of a relatively concentrated, very pure ammonium molybdate solution.

In accordance with the process of the invention, the vanadium-and molybdenum- containing solution whose pH has been brought to a value between 1½ and 7 is contacted with a weakly basic anion exchanger in the salt form and the anion exchanger is subsequently eluted with an ammonium hydroxide solution having a strength between 1 and 4N and the resulting ammonium vanadate is crystallized and isolated from the vanadium- and molybdenum-containing solution obtained in the elution.

Before the aqueous solution containing the heavy metal is contacted with the weakly basic anion exchanger, the pH of the solution is, according to the invention, brought to a value between 1½ and 7, and preferably between 2 and 5, in so far as the solution does not yet have such a pH-value.

Use may be made of any type of suitable weakly basic anion exchanger, such as a halogen-alkylated macroporous starting polymer aminated with a secondary amine, the starting polymer being obtained by suspension polymerization of one or more ethylenically unsaturated compounds at temperatures which are generally in the range of 10°–160° C and in the presence of a radical initiator, for instance: benzoyl peroxide, lauroyl peroxide and/or cumene hydroperoxide. The polymerization may be carried out in the presence, if desired, of one or more compounds which are capable of precipitating and/or solvating the polymer to be prepared, for instance: hexane, heptane, cyclohexane, amyl alcohol, cyclohexanol, benzene, toluene and/or chlorobenzene. Moreover, a linear polymer, such as polystyrene, may have been dissolved in the monomer compound(s).

The monomer used for the preparation of the starting polymer may be, for instance, a monovinyl aromatic compound such as styrene, vinyl toluene, vinyl ethyl benzene, vinyl naphthalene and vinyl anisole, or mixtures of the afore-mentioned compounds. It is preferred to use styrene. Besides the monovinyl aromatic compound(s) a cross-linking monomer may be used, for instance in amounts not exceeding 50% by weight, based on the total amount of monomers. Such use, however, is optional.

As cross-linking monomer a compound containing at least two ethylenically unsaturated groups, for instance: 1,3-butadiene, isoprene or vinyl methacrylate may be used, but preferably di- or polyvinyl aromatic compounds such as divinyl ethyl benzene, trivinyl benzene, and more particularly technical divinyl benzene should be employed. The preparation and the composition of the weakly basic anion exchanger to be used according to the invention are very well known to a person skilled in the art and need not be described here in detail.

According to the process of the invention the weakly basic anion exchanger is substantially in the salt form, for instance in the sulphate or the chloride form. It is preferred that use be made of an anion exchanger obtained in the sulphate form.

The temperature at which the anion exchanger is loaded with vanadate and molybdate is generally in the range of 5° to 95° C, and preferably in the range of 20° to 90° C. Although the anion exchanger may be loaded in any suitable manner, for instance upwardly or downwardly and in one or more steps, it is preferred that use be made of at least 2 columns connected in series, and always one column is loaded up to at least 70% of the equilibrium loading under the prevailing loading conditions before it is eluted.

By equilibrium loading is to be understood here, as usual, such a loading of the ion exchanger as is obtained when the concentration of the heavy metal compounds in the effluent from the column is equal to that of the feed liquor.

After the ion exchanger has been loaded to the desired extent, it is eluted with ammonium hydroxide having a strength of 1–4N, and preferably of 1.5–2.5N. Elution is carried out at a temperature which is generally between 40° C and the boiling temperature of the aqueous medium, and preferably between 70° and 95° C. After elution with the ammonium hydroxide the anion exchanger may, if desired, still be contacted with, for instance, a sodium hydroxide or a sulphuric acid solution in order to remove any remaining vanadate and molybdate.

The ammonium vanadate present in the aqueous solution obtained by the elution of the anion exchanger crystallizes in a simple way and can readily be isolated from the molybdate contained in the solution. It is preferred that the pH of the eluate be brought to a value between about 8 and about 8½, for instance with ammonium hydroxide or with sulphuric acid, before the ammonium vanadate is isolated. The eluate is strongly supersaturated with ammonium vanadate.

One would therefore expect instantaneous crystallization of the ammonium vanadate with attendant blocking up of the ion exchanger column. Under the conditions of the process of the invention, however, there will be no premature crystallization and the ammonium vanadate will crystallize outside the column. Furthermore, the molybdate solution can be processed in the usual manner, for instance by acidification, after which the precipitated molybdic acid can be filtered off. If desired, the molybdate solution can be used as such.

After the anion exchanger has been eluted, it is generally made suitable for loading the heavy metal compounds in a new cycle by conditioning the exchanger with, for instance, sulphuric acid or hydrochloric acid. Between the loading, elution and conditioning steps the ion exchanger is, of course, generally washed with as a rule demineralized or soft water.

DESCRIPTION OF THE PREFERRED EMBODIMENTS

EXAMPLE 1

Two columns connected in series were filled with in all 2 liters of a weakly basic anion exchanger having a capacity of 1400 meq/l weakly basic groups, which exchanger was obtained by chloromethylation and amination with tetraethylene pentamine of a copolymer made up of 92% by weight of styrene and 8% by weight of divinyl benzene. The anion exchanger was brought into the sulphate form with the use of 1.2N sulphuric acid. Subsequently, 11 liters of an aqueous solution containing 120 g/l sodium sulphate, 17.5 g/l sodium vanadate (calculated as V) and 7.8 g/l sodium molybdate (calculated as Mo) and having a pH of 4, were downwardly passed through the two columns at a temperature of 70° C.

The first column was loaded such that the concentration of heavy metals in the effluent was the same as that in the feed liquor. As a result, the first column contained 230 g of heavy metal (calculated as metal) per liter of resin. The concentration of heavy metals in the effluent from the second column was then 5 ppm.

Subsequently, the anion exchanger was eluted with ammonium hydroxide having a strength of 1.5N and at a temperature of 70° C. In the resulting solution 277 grammes of ammonium vanadate crystallized and were isolated in the usual manner. The amonium vanadate was only found to contain 0.1% by weight of molybdate (calculated as Mo). After the ammonium vanadate crystals had been isolated, the solution contained 54.5 grammes of ammonium molybdate (calculated as Mo) and as little as 0.4 grammes of ammonium vanadate (calculated as V).

EXAMPLES 2-7

The procedure of Example 1 was repeated, except that use was made of a weakly basic anion exchanger having a capacity of 1200 meq/l weakly basic groups, which was obtained by chloromethylation and amination with ethylene diamine of a copolymer composed of 94% of weight of styrene and 6% by weight of divinyl benzene. Elution was carried out at the elution temperature mentioned in Table 1 and with the use of ammonium hydroxide having the strength given in Table 1. The amount of ammonium vanadate which crystallized and the amount of ammonium molybdate contained in the eluate (calculated as V and Mo, respectively) are listed in Table 1 as percentage of the weight of the heavy metal compounds previously bonded to the anion exchanger (also calculated as V and Mo, respectively).

Table 1

| Example | Elution temperature (° C) | Strength ammonium hydroxide solution (N) | %V | %Mo |
|---|---|---|---|---|
| 2 | 20 | 1.5 | 60 | 80 |
| 3 | 20 | 2.0 | 59 | 82 |
| 4 | 40 | 1.5 | 72 | 80 |
| 5 | 70 | 1.5 | 88 | 92 |
| 6 | 90 | 1.5 | 97 | 96 |
| 7 | 90 | 3.8 | 80 | 90 |

COMPARATIVE EXAMPLE A

For comparison the procedure of Example 1 was repeated. Elution, however, was carried out with the use of an ammonium hydroxide solution having a strength of 5N; the elution temperature was 90° C. The ammonium vanadate in the elute crystallized so fast that a paste was formed in the discharge of the column, which was consequently blocked up. The total amount of ammonium vanadate crystallized was only 248 grammes.

COMPARATIVE EXAMPLE B

For comparison a solution having a pH of 4 and containing 85 g/l sodium sulphate, 10.9 g/l sodium vanadate (calculated as V) and 5.7 g/l sodium molybdate (calculated as Mo) was passed through a column filled with the anion exchanger according to Example 1 in the free-base form and at a temperature of 20° C.

At the beginning of the loading of the anion exchanger the concentration of heavy metal in the effluent from the column was as high as 1.0 g/l sodium vanadate (calculated as V) and 1/7 g/l sodium molybdate (calculated as Mo).

When per volume of resin 9 volumes of the solution had been passed through, the column contained per volume of resin only 84.7 grammes of vanadate (calculated as V) and 36.8 grammes of molybdate (calculated as Mo).

COMPARATIVE EXAMPLE C

For comparison a solution having a pH of 8.5 and containing 120 g/l sodium sulphate, 15.0 g/l sodium vanadate (calculated as V) and 7.5 g/l sodium molybdate (calculated as Mo) was passed through a column filled with the anion exchanger in the sulphate form according to Example 1.

The loading temperature was 20° C. Of the vanadate in the first four volumes of percolate per volume of resin that were collected 99% was exchanged for sulphate ions. In the following six volumes of percolate per volume of resin the percentage exchanged was much lower. For in the 5th volume of percolate the leakage level was 10% of the concentration in the feed liquor, which percentage rose to 85% in the 10th volume of percolate. After the ion exchanger had been contacted with the heavy metal-containing solution, the anion exchanger column contained per liter of resin only 80.1 grammes of vanadium and 34.7 grammes of molybdenum.

What is claimed is:

1. A process of separately recovering vanadium and molybdenum from an aqueous solution containing a vanadium compound and a molybdenum compound, comprising the steps of:
   a. adjusting the pH of said aqueous vanadium-and-molybdenum-containing solution to a value between 1.5 and 7;
   b. contacting said solution with a weakly basic anion exchanger in the salt form;
   c. eluting said anion exchanger with an ammonium hydroxide solution having a strength between about 1 and 4N; and
   d. crystallizing the resulting ammonium vanadate and separating same from the vanadium-and molybdenum solution obtained in said elution.

2. The process according to claim 1, in which the pH of the vanadium- and molybdenum- containing solution is brought to a value between 2 and 5, before said solution is contacted with the weakly basic anion exchanger.

3. The process according to claim 1, in which the anion exchanger is in the sulphate form.

4. The process according to claim 1, in which the temperature at which the anion exchanger is loaded with vanadate and molybdate is in the range of about 5° to about 95° C.

5. The process according to claim 1, in which the anion exchanger is contained in at least two columns connected in series.

6. The process according to claim 5, in which one anion exchanger column is loaded up to at least 70% of the equilibrium loading under the prevailing loading conditions.

7. The process according to claim 1, in which the anion exchanger is eluted with ammonium hydroxide having a strength of 1.5–2.5 N.

8. The process according to claim 1, in which the anion exchanger is eluted at a temperature between 40° C. and the boiling temperature of the aqueous medium.

* * * * *